United States Patent [19]
Ashmead

[11] Patent Number: 5,882,685
[45] Date of Patent: Mar. 16, 1999

[54] FOOD ENERGY UTILIZATION FROM CARBOHYDRATES IN ANIMALS

[75] Inventor: H. DeWayne Ashmead, Fruit Heights, Utah

[73] Assignee: Albion Laboratories, Inc., Clearfield, Utah

[21] Appl. No.: 823,827

[22] Filed: Jan. 22, 1992

[51] Int. Cl.$^6$ .................................................. A01N 59/16
[52] U.S. Cl. ........................ 424/617; 427/630; 427/639; 427/641; 427/646; 514/784; 514/788
[58] Field of Search .................................... 424/617, 630, 424/639, 641, 646; 514/784, 788

[56] References Cited

U.S. PATENT DOCUMENTS 4,863,898    9/1989  Ashmead et al. ............................ 514/6

OTHER PUBLICATIONS

Buts et al. *American Journal of Physiology,* vol. 251, 1986 G736–G743.

*Primary Examiner*—Leon B. Lankford, Jr.
*Attorney, Agent, or Firm*—Thorpe, North & Western

[57] ABSTRACT

A method for facilitating digestion of carbohydrates into simple sugars in warm-blooded animals by maintaining and enhancing the natural disaccharidase enzymatic activity in the mucosal cells of the small intestines. Iron is an essential mineral and other minerals selected from the group consisting of copper, zinc, manganese and cobalt are provided in the form of amino acid chelates having a ligand to mineral molar ratio of at least 1:1, a molecular weight of no more than 1500 daltons and a stability constant of between about $10^6$ and $10^{16}$ and administered orally. Additionally, magnesium and chromium, as amino acid chelates, may be added to improve disaccharidase activity as may potassium in inorganic salt form or as a 1:1 ligand to potassium amino acid complex. The minerals are taken into the mucosal cells lining the small intestine where they are utilized to facilitate the production and activity of disaccharidase enzymes such as maltases, sucrase and lactase. These enzymes promote the hydrolysis of disaccharides resulting from degradation of more complex carbohydrates or of sucrose and lactose into simple sugars or monosaccharides for absorption from the intestinal tract.

16 Claims, No Drawings

FOOD ENERGY UTILIZATION FROM CARBOHYDRATES IN ANIMALS

BACKGROUND OF THE INVENTION

This invention relates to improving energy derived from digestion of carbohydrates in warm-blooded animals. More particularly, this invention relates to improving the digestion coefficient of carbohydrates in warm-blooded animals through the use of certain amino acid chelates to stimulate and enhance enzymatic carbohydrase activity.

In formulating feeds or diets for warm-blooded animals, including human beings, five of the six basic nutrients are generally taken into account. These are carbohydrates, proteins, fats, vitamins and minerals; the sixth nutrient being water. The percentage of each nutrient digested in the food is called its "digestion coefficient." Average digestion coefficients for many foods or ingredients of foods are provided in data tables as a result of numerous balance studies.

Balance studies are done by first analyzing the food for the percentage of each nutrient that it contains. After a preliminary period of several days to allow the residue of any former food to be eliminated, a certain quantity of experimental food with a known nutrient composition is fed daily to the test animal or animals. The feces are collected, weighed and analyzed. The differences between the amount of the nutrient in the food ingested and the amount found in the feces is the amount of nutrient that is digested from the food being studied. As stated above, the percentage of food digested is called the digestion coefficient.

In addition to digestion coefficients one should also consider net energy values of the carbohydrates being ingested. The six nutrients listed above have three basic functions: (1) to provide a source of energy; (2) for growth and maintenance of body tissue; and (3) to regulate body process. The provision of energy is the predominant role and must be satisfied at the expense of the other nutritive roles if there are insufficient nutrients to accomplish all three functions.

Not all of the energy from the food, as measured by the digestion coefficient, goes to support the animal. Some of that energy is lost in the urea and other nitrogenous waste products that are excreted in the urine. In the case of ruminants, and to a lesser extent monogastric animals, a small amount of energy is lost in the combustible gases, such as methane, which is produced in the digestive tract. There is a considerable loss of energy which occurs in the various necessary processes of chewing, digesting, and assimilating the food. Thus, one must deduct these losses from the total gross energy digestion coefficient to obtain the net energy value.

Any improvement which can be made in the efficiency of digestion of the carbohydrates, which is a major energy source in foods, is of real economic and nutritional importance.

The role of carbohydrates is to provide a source of energy for the animal or man. Although energy can also be obtained from fats and proteins, carbohydrates are generally the major source of energy in the diets of animals and man. A certain amount of ingested carbohydrates remains undigested and is collected in the feces. The potential energy value of that undigested carbohydrate is lost to the animal. Furthermore, if digestion is inefficient, more potential energy will be lost in the digestion process than is necessary. This makes inefficient digestion of carbohydrates result in greater expense because more carbohydrates must be consumed to meet its energy needs, or in the alternative, the animal must ingest more dietary fats or proteins which are more expensive sources of energy. Furthermore, with growing animals or children it is not profitable to remove body stores of fat or protein to meet energy needs. Thus it would be beneficial both economically and to the recipient host to improve the digestion coefficient and net energy values of carbohydrates by improving their digestibility.

OBJECTS AND BRIEF SUMMARY OF THE INVENTION

It is therefore an object of the present invention to provide a composition which, when ingested, will enhance the carbohydrate digestion coefficient of an animal.

It is also an object of this invention to provide a composition which, when ingested, will maintain and/or enhance the intestinal disaccharidase content and activity of the animal enabling maximum digestion of disaccharides in the intestine and promoting their absorption through the intestinal walls.

A still further object of the invention is to provide a method for facilitating digestion of carbohydrates into simple sugars by maintaining and enhancing the natural enzymatic activity of the animal through the administration of appropriate minerals needed for such digestive activity.

These and other objects may be realized by providing an appropriate formulation containing at least iron in the form of an amino acid chelate and optionally supplementing the iron formulation with other minerals selected from the group consisting of zinc, copper, manganese and cobalt which are also in the form of amino acid chelates. Additional digestive efficiency of carbohydrates may, in some circumstances, be obtained by also adding one or more other mineral supplements selected from the group consisting of magnesium and chromium in the form of amino acid chelates. Also, potassium may be provided in the form of an amino acid complex or chloride salt or mixture or both.

By appropriate formulation is meant the providing of iron, and, if used, zinc, copper, manganese, cobalt, magnesium, chromium and potassium in a form which is bioavailable to the animal at the proper intestinal mucosal cell utilization site. Also, the ratio of one mineral to another may be significant and may vary depending upon the species of animal, and the degree to which the digestion coefficient needs to be improved.

Bioavailable forms of iron, copper, zinc, manganese, cobalt, magnesium, chromium and potassium which are properly utilized in the mucosal cells lining the intestinal tract of a warm-blooded animal are those made by chelating or complexing the mineral with an amino acid or peptide ligand wherein the ligand to mineral ratio is at least 1:1 and, except for potassium, is preferably 2:1 or higher and wherein the molecular weight of the amino acid chelate formed is not greater than 1500 daltons and preferably does not exceed 1000 daltons. Such amino acid chelates are stable and are generally taught in the prior art to be absorbed intact through the intestinal tract via an active dipeptide transport system. It has not previously been known that, when properly administered, such chelates can affect disaccharidase production and disaccharide hydrolysis at the brush border membrane of the mucosal cells of the small intestine while still in the lumen. Such amino acid chelates have a stability constant of between about $10^6$ and $10^{16}$. A more detailed description of such chelates and the method by which they are absorbed through the intestine is documented in Ashmead et al., U.S. Pat. No. 4,863,898 which issued Sep. 5, 1989 and also in Ashmead et al., Intestinal Absorption of Metal Ions and Chelates, Published by Charles C. Thomas, Springfield, Ill. 1985. This invention, however, is not directed to metal uptake into tissues or metal transport across the intestine for absorption in the blood. Therefore, although amino acid chelates and some of the uses to which they are applicable are documented in the art, there is no teaching that proper formulations and administration of such chelates can affect disaccharidase production and activity in the lumen.

DETAILED DESCRIPTION OF THE INVENTION

As stated above, the primary function of carbohydrates in the animal is as a source of energy. When simple sugars are metabolized, energy is released. However, to be utilized as a source of energy in the body, carbohydrates must first be degraded into simple sugars. Then metabolic processes convert the simple sugars into carbon dioxide and water, or alcohols in the case of fermentation, accompanied by the release of energy. These simple sugars or monosaccharides are also utilized as raw materials for synthesis of a variety of organic compounds such as steroids, amino acids, purines, pyrimidines, complex lipids and polysaccharides. However, the object of this invention is not the metabolism of simple sugars. Rather, it is the digestion or degradation of more complex sugars or carbohydrates into simple sugars where their uptake into the body from the intestinal tract can be facilitated and where they can be utilized as sources of energy and raw materials. For these reasons the efficient digestion and metabolism of carbohydrates is of paramount importance to the overall feeding efficiency of the animal as well as for the well being of man. A less than optimal degree of carbohydrate digestion and metabolism will result in poorer feed utilization and will increase feeding costs. While this may not have the same degree of economic consequence in man as it does in animals, it certainly has an effect on his overall well being.

Carbohydrates are classified into three groups: monosaccharides (simple sugars including triose, tetrose, pentose, hexose and heptose), oligosaccharides (disaccharides and trisaccharides) and polysaccharides (starch, glycogen, dextrins, gum, mucilage, inulin, cellulose, etc.). The monosaccharides cannot be hydrolyzed into simpler sugars. However, by the appropriate use of acid or enzymes, the higher saccharides can be hydrolyzed into simple sugars. In the body, the oligosaccharides and polysaccharides are converted to monosaccharides by enzymatic action in the saliva (salivary amylase), from pancreatic secretions (pancreatic amylase), and from enzymes produced in the small intestine i.e. disaccharidases and oligosaccharidases inclusive of maltase, isomaltase, lactase, sucrase and trehalase.

Of the simple sugars, the hexoses are clearly the most important in energy production. These six carbon containing sugars are made up of glucose (also called dextrose or corn or grape sugar), fructose (also called levulose or fruit sugar), galactose and mannose. Most polysaccharides, e.g. starch, glycogen, dextrin and cellulose, yield glucose as the end-product of complete hydrolysis. Some, such as inulin, yield fructose, and some, such as certain gums, yield galactose. Of the various monosaccharides, glucose is clearly to most prevalent as the base source of energy.

Of the oligosaccharides, the disaccharides are more common than trisaccharides. Disaccharides include sucrose (also called cane, beet or table sugar), lactose (called milk sugar) and maltose. On hydrolysis, sucrose in converted into one molecule each of glucose and fructose. Lactose is hydrolyzed to glucose and galactose and maltose yields two molecules of glucose.

Sucrose is hydrolyzed in vivo by the enzyme sucrase in the intestine into glucose and fructose. Lactose is hydrolyzed to glucose and galactose by the enzyme lactase, also in the small intestine. Maltose is obtained in vivo when starch is hydrolyzed by an enzyme (ptyalin) found in saliva and is further hydrolyzed into glucose by the enzyme, maltase, in the small intestine.

The polysaccharides, also referred to as complex carbohydrates, are composed primarily of glucose with some containing fructose and galactose as described above. Starch and glycogen are the most common polysaccharides.

Starch, which occurs abundantly in grains, tubers, and fruits is largely the source of carbohydrates for humans and herbivorous animals. However glycogen (animal starch) which is found in liver and muscles is also a source of complex carbohydrates for carnivores and humans. Glycogen is also found in some of the higher plants such as corn.

From the above, it is evident that both starch and glycogen are polymers of glucose. Starch is made up of two types of molecules, i.e. a linear or non-branched polymer called amylose and a branched polymer called amylopectin. Glycogen is made up on a branched polymer very similar to amylopectin.

Amylose, which is well defined in the literature, is a linear polymer of glucopyranose units joined by an alpha linkage at the first and fourth carbon atoms (referred to as a 1,4-linkage). The molecular weight of amylose varies from about 150,000 to 600,000 daltons, indicating that there are from about 1000 to 4000 glucose units per molecule.

Both amylopectin, from starch, and glycogen have similar structures. These glucose polymers are held together by two types of alpha linkages, a 1,4-glucopyranose linkage and a 1,6-glucopyranose linkage. The 1,4 linkages form straight chains whereas the 1,6 linkages occur on the straight chains at points where one straight chain branches from another. These structures are also well defined in the literature.

Amylopectin and glycogen differ in that glycogen has shorter and more frequent branching. In other words, glycogen contains more 1,6-linkages than does amylopectin. In amylopectin there is about one 1,6-linkages for each 20–25 glucose units. In glycogen there is about one 1,6-linkage for each 10–18 glucose units and branching may occur as often as every six glucose units. The molecular weights of amylopectin and glycogen are much higher than amylose. Amylopectin molecular weights may vary from about one to six million and molecular weights of glycogen can go as high at 100 million daltons.

The ratios or amounts of amylose and amylopectin in starch vary from plant to plant species. In general, most starches yield between about 10–30% amylose and 70–90% amylopectin. In corn, for example, the starch is made up of about 27% amylose and 73% amylopectin. The amylopectin portion of corn starch has about 96% 1,4-linkages and 4% 1,6-linkages.

The amylases of the saliva and pancreatic secretions attack the 1,4 linkages of starch and glycogen. These enzymes convert the bulk of the ingested carbohydrates into glucose or disaccharides. The alpha-amylases, also called endoamylases, attack the 1,4-linkages at random yielding both glucose and maltose. The alpha-amylases cannot break the 1,6-linkages of the amylopectin and glycogen molecules and residues remaining after the 1,4-linkages have been broken are referred to as limit dextrins. Another enzyme, amylo-1,6-glucosidase (called R-enzyme or isoamylase) splits only the 1,6-linkages.

The only disaccharide resulting from the hydrolysis of starch or glycogen is maltose. However, other disaccharides such as sucrose and lactose may also be present in the diet. These disaccharides, if not previously degraded, are presented to the intestinal mucosa where disaccharidases break the connecting linkages resulting in two monosaccharides. There are three classes of disaccharidase enzymes: glucosidases, glactosidases and fructosidases.

The primary glucosidases in the intestine are alpha-glucosidases or maltases. However, beta-glucosidase or cellobiase is also found in intestinal mucosa as well as in the kidney and liver. These enzymes split maltose into two molecules of glucose. The galactosidases are in two forms, alpha-galactosidase, or melibiase, hydrolyses the conversion of alpha-galactosides to galactose. Beta-galactosidase, or lactase, occurs in the intestinal mucosa as well as in the liver and kidney and hydrolyses lactose into glucose and galactose. The third disaccharidase enzyme, fructosidase (beta-fructofuranoside fructohydrolase) is also called invertase and sucrase. It is absent at birth in some animals (including man) resulting in an intolerance to the digestion of sucrose. However, its level rises shortly after birth and catalyzes the hydrolysis of sucrose into glucose and fructose.

In order to maximize the energy contained in carbohydrates, it is important that complete digestion to the monosaccharide stage be accomplished in the gastrointestinal tract. Otherwise, undigested residues will be excreted in the feces and lost. It is well known that lactose, or milk sugar, is not absorbed as a disaccharide and must be hydrolyzed in the small intestine by galactosidase into glucose and galactose. Not only is energy potential lost if lactose is not hydrolyzed, but there are also undesirable side effects. In most mammals, lactase activity is limited even during the suckling period and disappears after weaning. At its maximum, human lactase activity is 10 to 15% that of maltase. Insufficient lactase activity can present serious problems in humans, particularly in infants and children. In humans, for example, there is an increase in the osmotic load resulting from extraluminal fluid which intensifies intestinal motility resulting in a bloated feeling, production of excessive carbon dioxide leading to flatulence, increased abdominal discomfort and diarrhea.

The disaccharidase enzymes are located on the brush border of the mucosal cells of the intestine. They not only digest the disaccharides into monosaccharides in the manner described above but they also facilitate the transfer of these sugars across the membrane. Thus, they are integral to the ultimate absorption of the carbohydrates as simple sugars. Glucose, galactose and fructose are all readily absorbed from the intestinal lumen with high efficiency, but at different rates. Galactose is absorbed more readily than glucose which, in turn, is absorbed more readily than fructose. The overall efficiency of absorption depends upon the removal of these monosaccharides by outward diffusion on the serosal side of the cell where they are rapidly removed by the circulation.

Disaccharide digestive activity in the intestinal tract begins in the distal duodenum, is maximal in the jejunum and continues through the proximal ileum. Disaccharide hydrolysis does not occur in the lumen per se but in or at the surface of the mucosal cells. Secretion of disaccharidase enzymes to the mucosal cells are from Brunner's glands of the duodenum and glands of Lieberkuhn both of which are located in the mucous or submucous layer of the duodenum or jejunum portions of the small intestine.

The absorption of digested carbohydrates as monosaccharides from the intestine is influenced by general condition of the animal. This not only includes the general health of that animal, but also its current nutrition. If its mineral nutrition is either inadequate or chemically present but nutritionally unavailable to the animal, the disaccharidase activity is limited. It has generally been thought that mineral nutrition was effective only when the mineral had crossed the intestinal lining and entered into the bloodstream. The present invention shows that certain mineral nutrition becomes effective even before intestinal absorption occurs.

Ashmead et al., U.S. Pat. No. 4,020,158; Ashmead, U.S. Pat. No. 4,076,803; Jensen U.S. Pat. No. 4,167,564; Ashmead, U.S. Pat. No. 4,774,089 and Ashmead, U.S. Pat. No. 4,863,806 All teach various uses for amino acid chelates in reference-to increasing absorption of essential minerals into biological tissues. Some of these patents suggest that certain mineral and ligand combinations can enhance metal uptake in specific organs or tissues where specific biological functions are enhanced, i.e. minerals crossing the placental membranes into foeti, estrus or spermatogenesis, etc. However, it has not heretofore been known that disaccharidase enzymatic activity at the mucosal surface defining the lumen of the small intestine, as distinguished from tissue uptake, can be affected directly through the proper administration of amino acid chelates. Disaccharidase enzymes function in or at the surface of mucosal cells where disaccharide hydrolysis occurs and not in the intestinal lumen. Hence, affecting brush border enzymatic functioning is entirely different from influencing post absorption mineral uptake into tissues or to the post absorption direction of minerals to certain tissue sites.

As indicated above, the splitting of any disaccharide or more complex carbohydrates into simple sugars is essential for their absorption and assimilation. The digestive process for carbohydrates, which begins with the amylase in the saliva, must be completed by the intestinal disaccharidase enzymes such as maltase, lactase, sucrase, trehalase, and cellobiase, if the carbohydrate is to be absorbed and utilized as an energy source. Once the carbohydrate passes through the small intestine as a disaccharide or in a more complex form, it cannot be assimilated and is lost to the feces. The carbohydrase enzymes do not take part in the digestive hydrolysis process themselves, but their presence facilitates the process.

The template for the production of the carbohydrase enzymes is found within the DNA of the cell. When the demand for a specific disaccharidase enzyme is requested within the DNA of appropriate cells, presumably the cells of Brunner's glands of glands of Lieberkuhn, the template is issued and various enzymes utilized in the intracellular synthesis of the carbohydrase enzyme. Enzymologists have not yet identified all of the enzymes required to construct the specific digestive enzymes referred to above. However, it is known that many enzymes require specific metal ions for their activation and participation. In some instances these activators function in combination with the protein portion of the enzyme. In others, the metal ion forms a compound with the substrate, and it is the metal-substrate complex that reacts or coacts with the enzyme. The latter case is particularly applicable when cellular enzymes are constructing another enzyme which is metal dependent.

The DNA molecule requires zinc for replication and synthesis. The exact role(s) of zinc are still being elucidated. However, it is now clear that zinc is an integral part of the DNA molecule in the what is know known as the "fingers" of the DNA molecule.

It is probable that components for the production of the carbohydrase and other digestive enzymes are produced in the nuclear fraction of the cell, i.e. the mitochondria, the lysosomes, the microsomes and the supernatant. The supernatant, which is the soluble fraction of the cell, is probably the area where synthesis of the digestive enzymes is completed. A more complete discussion is found in C. H. Gallagher, Nutritional Factors and Enzymological Disturbances in Animals, J. B. Lippencott Co, Philadelphia (1964).

It is believed that the assembled disaccharidase enzymes are mineral activated, although to date specific metals for these enzymes have not been identified and results of mineral activation are largely empirical. K. Schutte, The Biology of Trace Elements, J. B. Lippencott Co., Philadelphia (1964) lists numerous enzymes which are affected by the presence or absence of specific metals. For example, amylase, the carbohydrase found in saliva and pancreas and which is essential for the digestion of carbohydrates, is affected by certain metals having integrating functions which are not yet fully understood. Calcium, magnesium and potassium are included in the elements which affect amylase.

Once the digestive enzymes are assembled within the cell they are either enveloped with the same type of protective covering to prevent them from digesting within the cell or they are not yet active due to the absence of a specific activating metal. In the last situation, the activating metal is introduced to the enzyme after its expulsion from the cell. There are data that suggest this is probably what occurs.

As shown by Iyengar et al., The Elemental Composition of Human Tissues and Body Fluids, Verlag Chemie, Weinheim, New York (1978) chemical analysis of specific body fluids show a consistent amount of certain minerals. Presumably these minerals in proper balance are required for proper biological functioning. Digestive fluids also contain specific amounts of minerals, such as copper, as shown by Convar et al., Mineral Metabolism, Academic Press, New York (1962). Underwood, Trace Elements in Human and Animal Nutrition, 4th Edition, Academic Press, New York (1977) states that carbohydrate metabolism requires the presence of manganese, zinc and chromium in specific enzymes in order for the body to derive the benefit of the ingested carbohydrates.

Research, being prepared for publication, shows that the disaccharidase, lactase, is produced and expelled in the crypt of the villus in the small intestine. Lactase migrates to the tip of the villus and becomes active only if there is adequate iron present. In an iron deficient state, the lactase remains in the crypt and is inactive.

Based on the above and from empirical data, it is believed that specific minerals are needed within the mucosal cell to activate enzymes needed to assemble the digestive carbohydrase enzymes. A review of data in Ashmead et al., Intestinal Absorption of Metal Ions and Chelates, Published by Charles C. Thomas, Springfield, Ill. 1985 indicates that the majority of the absorbed amino acid chelates are transferred to the serosa intact.

However, it is also believed that, when properly formulated and administered, small fractions of amino acid chelates are taken into and utilized within the mucosal cells themselves. This assimilation into mucosal cells is, at least in part, for the metabolic purposes described above since cellular hydrolysis of the chelates seems to occur at the cytoplasmic site of usage. This invention is therefore based on the belief that an increase in the disaccharidase enzyme content or activity at the brush border in the intestinal lumen is a result of increased cellular production brought about by the presence of the proper minerals in the form of readily utilizable amino acid chelates.

The presence of the minerals in the lumen of the intestine might also facilitate greater enzymatic activity due to more cationic activators.

The amino acid chelates or complexes utilized have a ligand to mineral ratio of at least 1:1 and preferably 2:1 or greater, a molecular weight of no more than 1500 daltons and preferably not more than 1000 daltons and a stability constant of between about $10^6$ and $10^{16}$. In the field of animal nutrition, the American Association of Feed Control Officials has issued the following official definition: "amino acid chelate—a metal ion from a soluble salt with amino acids with a mole ratio of one mole of metal to one to three (preferably two) moles of amino acids to form coordinate covalent bonds. The average weight of the hydrolyzed amino acids must be approximately 150 and the resulting molecular weight of the chelate must not exceed 800." It is also documented that amino acid chelates can be prepared from metal ions which do not come from soluble salts. Ashmead, U.S. Pat. No. 4,599,152 and Ashmead, U.S. Pat. 4,830,716 both disclose methods of preparing pure amino acid chelates using metal sources other than soluble metal salts. However, it is not critical to the present invention which manner the amino chelates are made provided they meet the criteria stated above.

The amino acid compositions will preferably be administered to the warm-blooded animal orally. In many cases mixtures of the chelates in the food, drinking water or other ration forms given to the animal may be used. For example, the chelates may be mixed with salt (sodium chloride) when being administered to the bovine species. They may similarly be mixed with feed or rations destined for general animal or livestock usage. In the case of humans, the chelates may be administered in the form of tablets, capsules, powders, syrups, elixirs or any other suitable form. They may be mixed with fillers, excipients, vitamins and other foodstuffs.

The exact amount of mineral to be administered, and the ratio of one mineral to another, will depend upon animal species and the carbohydrate source and/or content in the diet. In other words, if the diet is high in dairy products it may be more important to emphasize lactase production than maltase or sucrase. Assay results of samples of tissue, serum or other body fluids may be of assistance in the proper formulation of the mineral chelate(s) to be administered. To make a determination, the correct interpretation of data may be more important than the actual numbers generated in an assay, and values must be correlated to bioavailability and antagonistic parameters of one trace element to another or from one trace element to other minerals such as copper and iron. An assay of the diet may also be important to determine mineral amounts in the diet as well as carbohydrate, protein and fat content and identify deficiencies and/or antagonistic factors which may affect trace minerals when administered.

Therefore, the exact amount of amino acid chelate, which minerals to use and in what ratios, are preferably determined on an empirical basis according to need. Hence, the term, "effective amount" of one or more minerals is based on both the amount of mineral and the ratio of one mineral to another which has been determined to be required to meet the needs of a particular warm-blooded animal or group of animals, including humans, to enhance the carbohydrate digestion coefficient. In some instances, based on collected data over periods of time, it will be possible to preformulate compositions based on known needs of the animal species ingesting particular types or forms of carbohydrates. However, one skilled in the art, based on the information provided herein, can determine without undue experimentation what an "effective amount" of a composition is and how to administer it accordingly. It is not possible to categorically state that "x" mg of trace mineral per kg of animal body weight is what is needed to optimize disaccharidase activity. Nor is it possible to state, for example, that the ratio of Fe to Cu or Zn will be "a:b" in all instances. Each animal species may require different amounts of minerals and/or ratios of minerals to maximize disaccharidase production and utilization. For animal species in which an RDA [recommended dietary allowance], or similar nutritional guideline, has been established, that amount may be used as a minimum or threshold "effective" amount to be administered to that species. However, in some instances, it may be possible to administer even lesser amounts which are also "effective" provided the correct mineral ratios are used. Furthermore, an RDA supposes to examine all sources of a mineral ingested by the host. In the present invention, supplementation will be in addition to that contained in food sources. Therefore, an "effective amount" of a mineral may be administered consisting less than an established RDA. If the mineral ingested is considered in all forms, i.e. foods, supplements, etc., the total amount of mineral administered, in amino acid chelated form, and as other organic or chelated forms and inorganic forms, may actually exceed the RDA.

Based on empirical data, amino acid chelated iron, preferably in ferrous form, appears to be the mineral most influential in promoting disaccharidase activity and improving carbohydrate digestion coefficients.

When iron amino acid chelate formulations are supplemented with one or more amino acid chelated minerals selected from the group consisting of zinc, copper, manganese and cobalt the disaccharidase activity is generally improved over that obtained using iron amino acid chelates alone. From the data thus far available it is believed that the optimal molar ratios of iron to copper, zinc and manganese are between about one mole iron to 0.1 to 0.5 moles each of copper, zinc and manganese. The mole ratios of copper, zinc and manganese to each other may vary from about 5:1 to 1:5. The molar ratio of iron to cobalt will be between about 1:0.003 and 1:0.015. Just what role each of these minerals plays in the synthesis and activity of the disaccharidase enzyme isn't known. It is also seen that digestive efficiency of disaccharides may be improved through the use of adding one or more minerals selected from the group consisting of magnesium and chromium, in the form of amino acid chelates, to the complement of iron combined with one or more minerals selected from the group consisting of zinc, copper, manganese and cobalt. When present, the molar ratio of iron to manganese will be between about one mole iron to 30 to 70 moles of manganese, with at least some or all of which may be present as an amino acid chelate. Chromium, when present will be in mole ratios about the same as that of cobalt, i.e. iron to chromium rations of between about 1:0.003 and 1:0.015. Finally, potassium in the form of an amino acid complex or inorganic salt, such as chloride, or mixture or both may be combined with iron, one or more minerals from the secondary group and one or more minerals from the tertiary group to provide even more improved disaccharidase synthesis and activity. When used, the potassium is preferably present in mole ratios, relative to iron, of between about 1:1 to 1:10 iron to potassium with ratios of about 1:5 being preferred.

The amino acid chelates are preferably present in ligand to metal ratios of at least 1:1. That is the maximum ligand to potassium ratio. However, divalent and metals having higher valencies and or coordination bonding site can accommodate ligand to metal ratios of 2:1 or even up to 4:1. However, for purposes of assimilation across the mucous cell membrane it appears that ratios of 2:1 to 4:1 are optimal. At higher ratios the molecular weight of the chelate becomes too high for assimilation.

The following examples are illustrative of the invention.

EXAMPLE 1

Recognizing the need for these enzymes to promote feed efficiency and that these essential enzymes are possibly metal activated and certainly dependent upon specific minerals such as iron for their mucosal cell production, an experiment was designed to ascertain if the feeding of amino acid chelates to an animal would increase enzymatic activity at the brush border of the intestinal cells.

The research was conducted using eight adult male Wistar-Hazemann white rats. Each rat weighed approximately 100 grams. They were individually caged in wire mesh cages. The rats were fed water and a commercial laboratory rat chow ad libitum for ten days containing all of the essential nutrients for an optimum rat diet. This ten days was considered a stabilization period.

At the end of the ten-day period the rats were arbitrarily divided into four groups of two rats each. The first group, the Control Group, continued to receive the commercial laboratory rat chow as above with no changes in its diet. The second, third, and fourth groups received the same laboratory rat chow plus a supplement of 0.5, 1.0 and 1.5 grams, respectively, of an amino acid chelate mixture per Kg of feed. These dosages are summarized in Table 1.

TABLE 1

Composition of Amino Acid Chelate Supplements

| | % in | % Supplemented at Different Levels | | |
|---|---|---|---|---|
| | Formula | 0.0 g/Kg | 0.5 g/Kg | 1.0 g/Kg | 1.5 g/Kg |
| Iron | 9.00% | — | 0.0045 | 0.009 | 0.0135 |
| Copper | 2.15% | — | 0.00107 | 0.00215 | 0.00322 |
| Zinc | 3.00% | — | 0.0015 | 0.0030 | 0.0045 |
| Manganese | 1.20% | — | 0.0006 | 0.0012 | 0.0018 |
| Cobalt | 0.08% | — | 0.00004 | 0.00008 | 0.00012 |

The three groups of rats received the dosages of amino acid chelates shown in Table 1 for ten consecutive days immediately following the stabilizing period. At the conclusion of the second feeding period, the rats were sacrificed by cervical dislocation.

The small intestines from the rats in each group were removed. The duodenum and an equal length of the upper jejunum, adjacent the duodenum, were excised from each intestine. The excised samples were cut along the mesenteric line and then rinsed with distilled and deionized water to remove luminal contents.

The mucous membrane was scraped away from these cleaned and flattened intestinal segments and put in labeled containers, each containing 4 ml of deionized distilled water. The membrane-water mixture was then homogenized for twenty minutes in an Ultraturrax Homogenizer and then stored at 0° C. until centrifuging at 3000 RPM for twenty minutes. The supernatant was collected and maintained at −18° C. until measurement of disaccharidase activity. Using electrophoresis methods discussed by Andrews, the disaccharidase activity in the mucous membrane was determined by measuring the quantities of five membrane bound disaccharidase enzymes. All comparisons for enzyme levels were measured against the control group as a standard. The findings are summarized in Table 2, and the data are expressed as percents of the control.

TABLE 2

Mean Disaccharidase Increase in Intestinal Mucous Membrane
With and Without Supplementation With Amino Acid Chelates

|  | No Supplementation | Amino Acid Chelate Supplement | | |
|---|---|---|---|---|
|  | Control | 0.5% | 1.0% | 1.5% |
| Maltase | 100 | 129 | 134 | 177 |
| Lactase | 100 | 136 | 147 | 157 |
| Saccharase | 100 | 178 | 163 | 135 |
| Trehalase | 100 | 113 | 212 | 142 |
| Cellobiose | 100 | 186 | 139 | 121 |
| Average | 100 | 148 | 159 | 146 |

As can be seen from the data in Table 2, the inclusion of amino acid chelates increased carbohydrate enzyme activity at the intestinal membrane an average of 48% when the chelates were included at the 0.5% level, 59% when the chelates were included at the 1.0% level, and 46% when the chelates were included at the 1.5% level. Although the enzymatic activity was increased over the control in each case that amino acid chelates were supplemented in the diet, the increases were not consistent. Some disaccharidase enzymes were more responsive to higher metal intake than others. This suggests that a different formulation than that in Table 1 containing different proportions or levels of minerals may have resulted in different enzymatic activity. The maltase and lactase activity increased with the higher amounts of minerals present. In the case of the saccharase, trehalase and cellobiose, after a certain level, any increased intake of metals seemed to suppress their activity. Whether this is a function of toxicity or simply providing the mineral combination in inadequate amounts or ratios and suppressing activity is unknown.

EXAMPLE 2

The experiments of Example 1 show that when the amino acid chelates were supplied to the animals in various quantities the disaccharidase activity in their small intestines more or less increased. They did not define whether the enzymatic activity was a result of metal activation of these enzymes or the result of greater enzyme production. Consequently, a second series of experiments was designed to determine this aspect of the intestinal disaccharidase activity.

For this study two groups of Wistar white male adult rats were used. One was designated as the control group and contained 16 animals. The other was the mineral deficient group and contained 10 animals. All of the rats were the same age and weighed approximately the same weight ($\approx$100 g).

The two groups of rats were provided the same water and diets ad libitum for a periods of 15 days except that the mineral deficient diet contained no iron. It was suspected that iron was playing a primary role in certain disaccharidase activities, because it was the principle mineral supplemented in the previous experiment as noted in Table 1. Furthermore, as it increased in dietary quantities both maltase and lactase activity also increased. The feed formulas given to the two groups are summarized in Table 3.

TABLE 3

Composition of Diets

| Ingredients | Control Diet | Fe Deficient diet |
|---|---|---|
| Casein | 18.00 g | 18.00 g |
| Mineral Supplement | 4.00 g | 4.00 g* |
| Cellulose | 2.00 g | 2.00 g |
| Soybean Oil | 10.00 ml | 10.00 ml |
| Cod Liver Oil | 1.00 ml | 1.00 ml |
| Corn Starch | 65.00 g | 65.00 g |
| Methionine | .03 g | .03 g |
| Vitamin Supplement | 5.00 ml | 5.00 ml |
| Calories/100 g of diet | 431 | 431 |

*Exactly the same minerals were in the supplements except for iron

This diet resulted in creating a severe iron deficiency in the iron deficient diet group very rapidly. Blood samples were taken from both groups on day 11, 13, and 15 of the experiment and assayed from hemoglobin levels, hematocrit levels, and red blood cell contents. Table 4 summarizes the differences all of which were statistically significant ($P<0.05$).

TABLE 4

Blood Analysis Summary

|  | Control Diet | Fe Deficient Diet |
|---|---|---|
| Hemoglobin | $10.3 \pm 0.36$ g/dl | $4.0 \pm 0.5$ g/dl |
| Hematocrit | $31.5 \pm 0.4\%$ | $13.3 \pm 1.8\%$ |
| Red Blood Cells | $5.02 \pm 0.24 \times 10^6$ | $1.18 \pm 0.2 \times 10^6$ |

Equal numbers of animals from both groups were sacrificed by cervical dislocation on day 11, 13, and 15 of the study. The purpose of staggered sacrificial days was to determine if increased iron deficiency resulted in corresponding reductions in disaccharidase activity. Unfortunately by day 11 of the study, the iron deficiency was so advanced there were little difference on day 11, 13 and 15. Consequently all of the data are summarized and reported together.

After sacrificing each animal, its small intestine was removed. A 4 cm segment was excised distal from the pylorus from each intestine. Next, a 4 cm segment was excised from each jejunum. Finally, 4 cm segments were excised from each ileum next to the ileocolic valve. Upon excision, each segment was immediately placed in an individual container containing sterile saline solution which was identified as to the tissue and the condition of the rat (+Fe or −Fe) from which it was removed.

Following all excisions each intestinal segment was removed from its container, cut longitudinally along the mesenteric line and then washed in sterile, deionized water to remove any external luminal contamination. They were then put in vials containing isotonic saline solution. Each vial was identified as described above.

Each intestinal segment was prepared for analysis of disaccharidase activity. The analysis for lactase was then conducted using a technique described by Dahlquist. It was decided to analyze for lactase quantities because the previous experiments had suggested that this particular intestinal enzyme was iron responsive. The results are summarized in Table 5. The differences between the control group and the iron deficient group were also analyzed statistically.

TABLE 5

Mcg of Lactase Per mg of Intestinal Tissue

|  | Duodenum | Jejunum | Ileum |
|---|---|---|---|
| Control Diet | 38.36 ± 6.384 | 62.18 ± 16.134 | 8.82 ± 3.284 |
| Fe Deficient Diet | 4.52 ± 2.974 | 56.65 ± 14.037 | 13.35 ± 4.265 |

($p < 0.05$)

It is obvious from this experiment that most of the lactase activity occurred in the duodenum and jejunum of the small intestine. A deficiency of iron significantly affected the production of this enzyme within the mucosal cells of the upper portion of the small intestine where the minerals are absorbed. If the iron and probably other minerals were ingested as inorganic metal salts, an artificial deficiency may be created due to the relatively poor absorption efficiency of the salts compared to amino acid chelates. Although in this experiment an analysis for the other enzymes listed in Table 2 was not conducted, one could nevertheless predict a similar result with maltase and perhaps the other enzymes based on the discoveries that were summarized in Table 2.

From these data, it appears that disaccharidase activity is a function of the nutritional well being of the mucosal cells that produce these enzymes than the presence of metallic co-factors for their activation. When those mucosal cells are provided a formulation of amino acid chelates which contain a predominant amount of iron amino acid chelate, disaccharidase activity increases because of the greater absorption of the chelates compared to minerals in the inorganic salt form.

The following examples are illustrative of various formulations which may be used to improve digestion coefficients of carbohydrate containing foods in warm-blooded animals.

EXAMPLE 3

A dairy herd of 46 cows were receiving a food ration consisting of corn silage, alfalfa hay and wheat. This ration contained, on a percent by weight basis, 15.7% carbohydrate, 1.76% fat and 9.05% protein. The average daily carbohydrate consumption was determined to be 3.92 kilograms and the carbohydrate digestion coefficient was determined to be 8.76%. The herd was divided into two groups of 23 cows each and continued to be fed on the same food ration administered ad libitum. Each group had a mineral supplement containing iron, zinc, copper, cobalt and manganese added to the feed. The mineral content added to each group was the same except that in one group the minerals were in the form of inorganic salts and in the other group the minerals were added as amino acid chelates having molecular weights and ligand to mineral ratios falling under the definitions given above as being applicable to the present invention. In the chelate group, the supplement was added at the rate of one gram of supplement per kilogram of feed and contained 2.34% iron, 0.48% zinc, 0.33% copper, 0.44% manganese and 0.01% cobalt. The iron:zinc:copper:manganese:cobalt molar ratios were 1.0:0.12:0.18:0.44:0.004. The inorganic supplement was added to provide the same amount of mineral per kilogram of feed.

Each diary group was feed their respective rations for a period of 221 days after which the carbohydrate digestion coefficients were again determined. The carbohydrate digestion coefficient of the inorganic mineral supplemented group remained substantially unchanged at 8.76% whereas the carbohydrate digestion coefficient of the chelated mineral supplemented group improved to 13.67%. This amounted to a 56% improvement in the amount of carbohydrate digested in the dairy cows.

EXAMPLE 4

To 15 swine was fed ad libitum a food ration consisting of 66% corn 10% soybeans, 7% wheat, 10% fish meal and the rest hay. This ration contained, on a percent by weight basis, 10.7% carbohydrate, and 13.4% fat. The ration was supplemented with inorganic mineral salts to provide the same mineral as the chelate formulation shown in Table 1 administered at the rate of 1 gm/kg of ration. The average daily carbohydrate consumption was not determined, but the carbohydrate digestion coefficient was determined to be 10.7% after 28 days on the ration. The herd was then given same the ration except that the inorganic mineral salts were replaced with the chelate composition shown in Table 1 administered at the rate of 1 gm/kg of ration. After 28 days on the chelate supplemented ration the carbohydrate digestion coefficient was again determined and found to be 16.8%. This show a 57% increase in carbohydrate digestion as compared with the control group administered minerals in the form of inorganic salts.

EXAMPLE 5

To 1000 broiler chicks was fed ad libitum a food ration containing 10% soybean meal, 4% peanut meal, 3% sunflower meal and 5% meat meal. This ration contained, on a percent by weight basis, 3.07% carbohydrate, 20.09% protein and 5.3% fat. The ration was supplemented with inorganic mineral salts to provide the same mineral as the chelate formulation shown in Table 1 administered at the rate of 0.5 gm/kg of ration. The average daily carbohydrate consumption was not determined but the carbohydrate digestion coefficient was determined to be 1.34% after 30 days on the ration. To 1000 other chicks was given the same ration except that the inorganic mineral salts were replaced with the chelate composition shown in Table 1 administered at the rate of 0.5 gm/kg of ration. After 30 days on the chelate supplemented ration the carbohydrate digestion coefficient was determined and found to be 2.1%. This shows a 57% increase in carbohydrate digestion as compared with the control group administered the same minerals in the form of inorganic salts.

EXAMPLE 6

To a control group of 200 turkeys was fed ad libitum a food ration containing 15% soy flour, 40% corn flour, 9.5% sunflower flour, 9.8% wheat, 7.6% fish scraps and 7.6% meat scraps. This ration contained, on a percent by weight basis, 2.6% carbohydrate, 27.5% protein and 4.5% fat. The ration was supplemented with inorganic mineral salts to provide the same mineral as the chelate formulation shown in Table 1 administered at the rate of 1.5 gm/kg of ration. The average daily carbohydrate consumption was not determined, but the carbohydrate digestion coefficient was calculated to be 1.1% after 150 days on the ration. To a chelate treated group of 200 other turkeys was given the same ration except that the inorganic mineral salts were replaced with the chelate composition shown in Table 1 administered at the rate of 1.5 gm/kg of ration. After 150 days on the chelate supplemented ration, the carbohydrate digestion coefficient was determined and found to be 1.7%. This shows a 55% increase in carbohydrate digestion as compared with the control group administered the same minerals in the form of inorganic salts.

EXAMPLES 7 TO 29

It is of interest to note that the percent increase in carbohydrate digestion in Examples 3 to 6 are comparable. While the increase in each instance is both significant and impressive, the closeness in range is purely coincidental. It is believed that much greater increases can be achieved through finding optimal amounts and ratios of iron and secondary minerals to administer in amino acid chelated form to selected animal species. Also, lesser increases, which might be attained in certain animal species, are still an important improvement in carbohydrate utilization. It is believed that any improvement in carbohydrate digestion attained by the present invention is a meaningful advancement in the art.

Ranges of typical formulations are illustrated in the following examples. A food ration similar to that shown in Table 3 is used consisting of 18% casein, 10% soybean oil, 1% cod liver oil, 65% corn starch, 0.03% methionine, with the remainder being cellulose. To this ration is added a vitamin and mineral supplement. In one ration the mineral supplement is in the form of inorganic salts. To another ration is added the same amount of minerals in the form of amino acid chelates formulated as described. Two groups of white Wistar male adult rats, ten in each group, weighing about 100 grams are fed the rations ad libitum for a period of 15 days. The control group receives the inorganic mineral supplement and the treated group receives the chelated mineral supplement. The ration, exclusive of the cellulose, has a carbohydrate content of about 13% w. After 15 days on the food ration, the carbohydrate digestion coefficient of the control and treated groups are determined by feces analysis for carbohydrate content which is compared with the carbohydrate content in the food ration. In each instance, the digestion coefficient of the chelate supplemented group is greater than the control inorganic salt treated group. The following Table 6 shows a representative range of formulations which may be utilized.

TABLE 6

| Example Number | % Minerals In Ration |
|---|---|
| 7. | 0.009 Fe |
| 8. | 0.009 Fe, 0.0030 Zn |
| 9. | 0.009 Fe, 0.0022 Cu |
| 10. | 0.009 Fe, 0.0012 Mn |
| 11. | 0.009 Fe, 0.00008 Co |
| 12. | 0.009 Fe, 0.003 Zn, 0.0022 Cu |
| 13. | 0.014 Fe, 0.005 Zn, 0.0001 Co |
| 14. | 0.014 Fe, 0.005 Zn, 0.0018 Mn |
| 15. | 0.0045 Fe, 0.0015 Zn, 0.0011 Cu, 0.0006 Mn |
| 16. | 0.0045 Fe, 0.0015 Zn, 0.0006 Mn 0.00004 Co |
| 17. | 0.014 Fe, 0.003 Cu, 0.0018 Mn |
| 18. | 0.014 Fe, 0.003 Cu, 0.00012 Co |
| 19. | 0.014 Fe, 0.0018 Mn, 0.00012 Co |
| 20. | 0.014 Fe, 0.005 Zn, 0.003 Cu, 0.00018 Mn, 0.00012 Co |
| 21. | 0.009 Fe, 0.003 Zn, 0.002 Cu, 0.199 Mg |
| 22. | 0.009 Fe, 0.003 Zn, 0.00012 Co, 0.00012 Cr |
| 23. | 0.009 Fe, 0.003 Zn, 0.0012 Mn, 0.199 Mg |
| 24. | 0.009 Fe, 0.003 Zn, 0.002 Cu, 0.0012 Mn, 0.199 Mg, 0.00012 Cr |
| 25. | 0.009 Fe, 0.003 Zn, 0.002 Cu, 0.0012 Mn, 0.00012 Co, 0.199 Mg, 0.00012 Cr |
| 26. | 0.009 Fe, 0.002 Cu, 0.0012 Mn, 0.199 Mg, 0.00012 Cr, 0.031 K |
| 27. | 0.009 Fe, 0.003 Zn, 0.00012 Mn, 0.199 Mg, 0.031 K |
| 28. | 0.009 Fe, 0.003 Zn, 0.002 Cu, 0.00012 Mn, 0.199 Mg, 0.00012 Cr, 0.031 K |
| 29. | 0.009 Fe, 0.003 Zn, 0.002 Cu, 0.00012 Mn, 0.00012 Co, 0.199 Mg, 0.00012 Cr, 0.031 K |

While the above provides a detailed description of the invention and the best mode of practicing it to the extent that it has been developed, the invention is not to be limited solely to the description and examples. There are modifications which may become apparent to one skilled in the art in view of the description contained herein. Therefore, the invention is to be limited in scope only by the following claims and their functional equivalents.

I claim:

1. A method for facilitating digestion of carbohydrates into simple sugars in warm-blooded animals by maintaining and enhancing the natural disaccharidase enzymatic activity in the mucosal cells of the small intestine which comprises the steps of:

(1) determining the need for improvement in digestibility of carbohydrates in said animal as evidenced by the monitoring of the carbohydrate digestion coefficient of said animal;

(2) providing a composition containing an effective amount of iron and at least one other mineral selected from the group consisting of zinc, copper, manganese and cobalt and mixtures thereof said iron and each of said other minerals being present in the form of an amino acid chelate having a ligand to iron or other mineral mole ratio of at least 1:1, a molecular weight of no more than 1500 daltons and a stability constant of between about $10^6$ and $10^{16}$ as needed, based upon said carbohydrate digestion coefficient determination, to maintain and enhance said enzymatic activity in said animal, and (3) orally administering an effective amount of said composition to said warm-blooded animal for a period of time sufficient to stimulate the production of natural disaccharidase enzymes and enhance the enzymatic activity thereof in said animal.

2. A method according to claim 1 wherein said ligand iron and other to mineral mole ratio is 2:1 or greater.

3. A method according to claim 2 wherein said chelate has a molecular weight no greater than about 1000 daltons.

4. A method according to claim 3 wherein said composition contains iron, zinc, copper, manganese and cobalt.

5. A method according to claim 4 wherein the molar ratios of iron to copper, zinc or manganese are between about one mole iron to 0.1 to 0.5 moles each of copper, zinc or manganese.

6. A method according to claim 5 wherein the mole ratios of copper, zinc and manganese to each other when present may vary from about 5:1 to 1:5.

7. A method according to claim 6 wherein the molar ratio of iron to cobalt is between about 1:0.003 and 1:0.015.

8. A method according to claim 4 wherein said composition additionally contains one or more minerals selected from the group consisting of magnesium and chromium said minerals also being in the form of an amino acid chelate having a ligand to mineral mole ratio of at least 1:1, a molecular weight of no more than 1500 daltons and a stability constant of between about $10^6$ and $10^{16}$.

9. A method according to claim 4 wherein said composition is administered in the food of said animal.

10. A method according to claim 9 wherein said composition is continuously available to said animal.

11. A method according to claim 4 wherein said composition is administered in unit dosage form.

12. A method according to claim 4 wherein said formulation additionally contains potassium which is present as an inorganic salt or as an amino acid complex having a ligand to potassium ratio of 1:1.

13. A method according to claim 8 wherein said composition is administered in the food of said animal.

14. A method according to claim 13 wherein said composition is continuously available to said animal.

15. A method according to claim 8 wherein said composition is administered in unit dosage form.

16. A method according to claim 8 wherein said formulation additionally contains potassium which is present as an inorganic salt or as an amino acid complex having a ligand to potassium ratio of 1:1.

* * * * *